US006866111B2

(12) United States Patent
Dubé et al.

(10) Patent No.: US 6,866,111 B2
(45) Date of Patent: Mar. 15, 2005

(54) METHOD AND APPARATUS FOR PROPORTIONALLY ASSISTED PROPULSION

(75) Inventors: Jean-Yves Dubé, 43 rue Fortin, Asbestos, Québec (CA), J1T 4E5; Guy Lafond, Danville (CA); Benoit Quirion, St-Bruno (CA)

(73) Assignee: Jean-Yves Dubé, Asbestos (CA)

( * ) Notice: Subject to any disclaimer, the term of this patent is extended or adjusted under 35 U.S.C. 154(b) by 0 days.

(21) Appl. No.: 10/393,392

(22) Filed: Mar. 21, 2003

(65) Prior Publication Data

US 2004/0050604 A1 Mar. 18, 2004

(Under 37 CFR 1.47)

Related U.S. Application Data

(63) Continuation-in-part of application No. PCT/CA01/01339, filed on Sep. 21, 2001.

(51) Int. Cl.$^7$ .............................................. B62M 23/02
(52) U.S. Cl. ...................... 180/207; 180/205; 180/206; 180/220; 180/65.2; 310/67 R
(58) Field of Search ................................ 180/205–207, 180/220, 65.2; 310/67 R, 67 A

(56) References Cited

U.S. PATENT DOCUMENTS

| 3,783,359 | A | 1/1974 | Malkiel |
| 3,991,843 | A | 11/1976 | Davidson |
| 4,044,852 | A | 8/1977 | Lewis et al. |
| 4,221,275 | A | 9/1980 | Pennebaker et al. |
| 4,364,448 | A | 12/1982 | Ikuma |
| 4,719,378 | A | 1/1988 | Katsuma et al. |

(List continued on next page.)

FOREIGN PATENT DOCUMENTS

| EP | 0 521 709 | 1/1993 |
| EP | 0 675 037 A1 | 10/1995 |
| EP | 0 734 945 A1 | 10/1996 |
| FR | 2 724 728 | 3/1996 |
| GB | 2 289 991 | 6/1995 |
| JP | 1008897 | 1/1989 |
| JP | 04004703 | 1/1992 |
| WO | WO 99/45350 | 9/1999 |

OTHER PUBLICATIONS

Annette Muetze et al., "Brushless–DC Motor using Soft Magnetic Composites as a Direct Drive in an Electric Bicyble", EPE 2001—Graz.

J. Cross and P. Viarouge, "Synthesis of High Performance PM Motors with Concentrated Windings", LEEPCI, Université Laval, Ste–Foy, Québec, Canada.

*Primary Examiner*—Lesley D. Morris
*Assistant Examiner*—Matthew Luby
(74) *Attorney, Agent, or Firm*—Ogilvy Renault; Guy Houle; Isabelle Chabot

(57) ABSTRACT

A system for the proportional propulsion assistance by a DC motor propulsion secured to a wheel of a bicycle propelled by a user person who provides an effort. The system has a strain gauge for the detection and measurement of a flexion of a stationary shaft of a rear wheel of the bicycle. The gauge is disposed on a vertical face formed on the shaft. An amplifier amplifies a measurement signal coming from the gauge. A filter is connected at the input of the amplifier. An analog to digital converter is connected at the output of the amplifier. A digital processing circuit digitizes the signal at the output of the amplifier to compensate for any deviation of the signal to calculate, in real time, the effort provided by the user person on the gears secured to the rotor housing of the DC motor secured to the fixed shaft and to control the assistance effort provided by the DC motor of the rear wheel of the bicycle to give a progressive assistance to the user person.

16 Claims, 6 Drawing Sheets

U.S. PATENT DOCUMENTS

| | | |
|---|---|---|
| 4,774,428 A | 9/1988 | Konecny |
| 5,006,745 A | 4/1991 | Nishio et al. |
| 5,164,622 A | 11/1992 | Kordik |
| 5,450,915 A | 9/1995 | Li |
| 5,675,196 A | 10/1997 | Huang et al. |
| 5,758,735 A | 6/1998 | MacCready, Jr. et al. |
| 5,777,442 A | 7/1998 | Miyata |
| 5,874,795 A | 2/1999 | Sakamoto |
| 5,909,781 A | 6/1999 | Yonekawa et al. |
| 5,937,962 A | 8/1999 | Yokoyama |
| 6,015,021 A | 1/2000 | Tanaka et al. |
| 6,118,196 A | 9/2000 | Cheng-Yon |
| 6,172,438 B1 | 1/2001 | Sakamoto |
| 6,225,773 B1 | 5/2001 | Sakamoto |
| 6,263,992 B1 * | 7/2001 | Li .............................. 180/206 |
| 6,340,067 B1 * | 1/2002 | Fujiwara et al. ............ 180/206 |

* cited by examiner

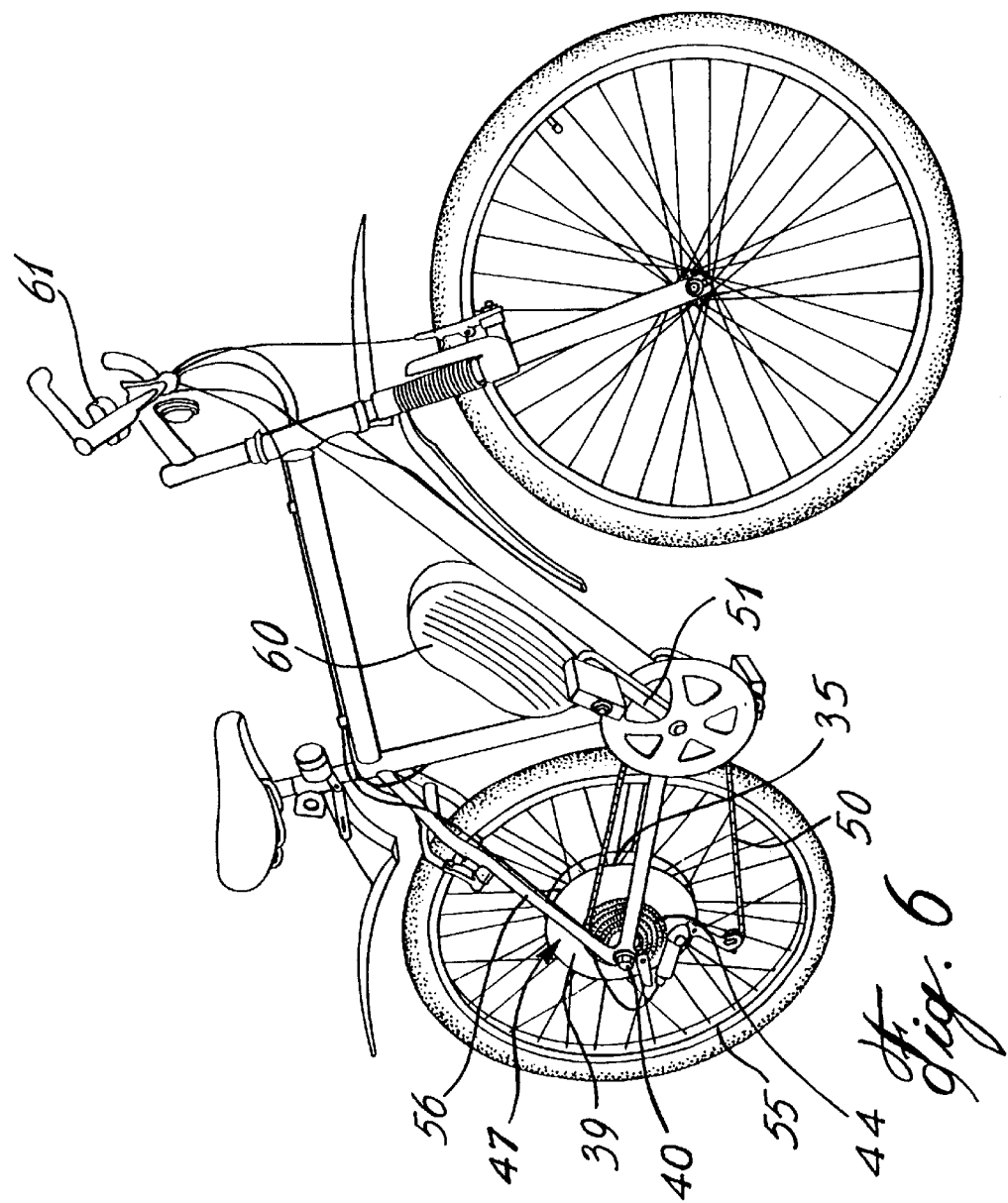

METHOD AND APPARATUS FOR PROPORTIONALLY ASSISTED PROPULSION

CROSS-REFERENCE TO RELATED APPLICATIONS

This is a Continuation-in-Part based on PCT patent application Ser. No. PCT/CA01/01339, filed Sep. 21, 2001. The application claims priority of Canadian patent application 2,319,848 filed Sep. 21, 2000 by Applicant.

FIELD OF THE INVENTION

The invention relates to proportionally assisted propulsion. More specifically, it relates to vehicles, for example, bicycles, equipped with a DC motor and a proportional assistance circuitry allowing the user of the vehicle to be assisted in propelling the vehicle.

BACKGROUND OF THE INVENTION

Cycling is a very popular sport and a mode of transportation. In some cities, more people travel to work and to school by bicycle than by car. Cycling has the main advantage of being an environmentally-clean mode of transportation and a very silent and enjoyable way of discovering a country or of traveling.

The use of electric motors as a motoring force for many types of vehicles and devices is desirable since such motors are pollution free, very quiet in operation, light and can be made compact. With such features, electric motors have progressively been given newer applications. For instance, wheeled transportation devices such as bicycles, tricycles, mopeds, scooters, and nautical transportation devices, such as personal watercrafts and small boats are all either known to have been propelled by electric motors or have the potential to be.

Electric power has emerged as a popular motoring force generator for some transportation vehicles since electric batteries may be recharged during use, thereby allowing such vehicles to become autonomous for long distances. For instance, an electric motor mounted to a bicycle may be recharged when the bike is going downhill, or when the bicycle is braked.

In prior art electric bikes, a specific fixed effort is requested from the electric motor and this effort is used to propel the bicycle. These bikes are therefore useful for traveling at a regular speed without pedaling. These bikes do not interact with the user and do not allow a compensative, proportional or progressive effort to be provided by the motor.

Other prior art electric bikes have proportional assistance and allow a compensation of the motor for the efforts of the cyclist. They often have electrical or electrical/mechanical units which provide the assistance. However, the assistance provided by the motor in those cases is not smooth. The cyclist is fully aware of the presence of the motor and of its assistance to the propulsion of the bicycle.

SUMMARY OF THE INVENTION

Accordingly, an object of the present invention is to provide a system which provides motorized assistance to the user propelling the vehicle by proportionally adapting to the effort provided by the user.

According to a broad aspect of the present invention, there is provided a system for proportionally assisting by a DC motor propulsion of a wheeled vehicle propelled by a user who provides a user effort, comprising detection and measurement means for detecting and measuring a flexion of a fixed shaft of a wheel of the vehicle on which the DC motor is secured and subjected to the user effort, the detection and measuring means being mounted on a flat vertical surface formed in the fixed shaft; assistance level request means for requesting a level of assistance to be provided; digitizing means for digitizing a signal obtained from the detection and measurement means; effort calculation means to calculate, in real time, the user effort provided by the user using the digitized signal; assistance level calculation means for calculating an appropriate assistance effort to be provided by a DC motor mounted on the wheel using a value of the user effort and a value of the level of assistance requested; control means for controlling an assistance effort to be provided by the DC motor mounted on the shaft of the wheel and using a value of the appropriate assistance effort; wherein the user effort and the level of assistance requested are used to proportionally assist propulsion of the vehicle by the DC motor.

According to another broad aspect of the present invention, there is provided a method for proportionally assisting a propulsion of a wheeled vehicle propelled by a user who provides an user effort, comprising detecting and measuring a flexion of a fixed shaft of the vehicle subjected to the user effort by a detection and measuring means mounted on a flat vertical surface formed in the fixed shaft; requesting a level of assistance to be provided; digitizing a signal obtained from the detection and measuring means; calculating, in real time, the user effort provided by the user using the digitized signal; calculating an appropriate assistance effort to be provided by a DC motor mounted on the wheel using a value of the user effort and a value of the level of assistance requested; controlling an assistance effort to be provided by the DC motor using a value of the appropriate assistance effort; wherein the user effort and the level of assistance requested are used to proportionally assist propulsion of the vehicle by the DC motor.

BRIEF DESCRIPTION OF THE DRAWINGS

These and other features, aspects and advantages of the present invention will become better understood with regard to the following description and accompanying drawings wherein:

FIG. 6 is a perspective view of a bicycle equipped with the DC motor secured on the shaft of axle of the bicycle, and controller components of the proportional assistance system.

DETAILED DESCRIPTION OF THE PREFERRED EMBODIMENT

Figure 1:
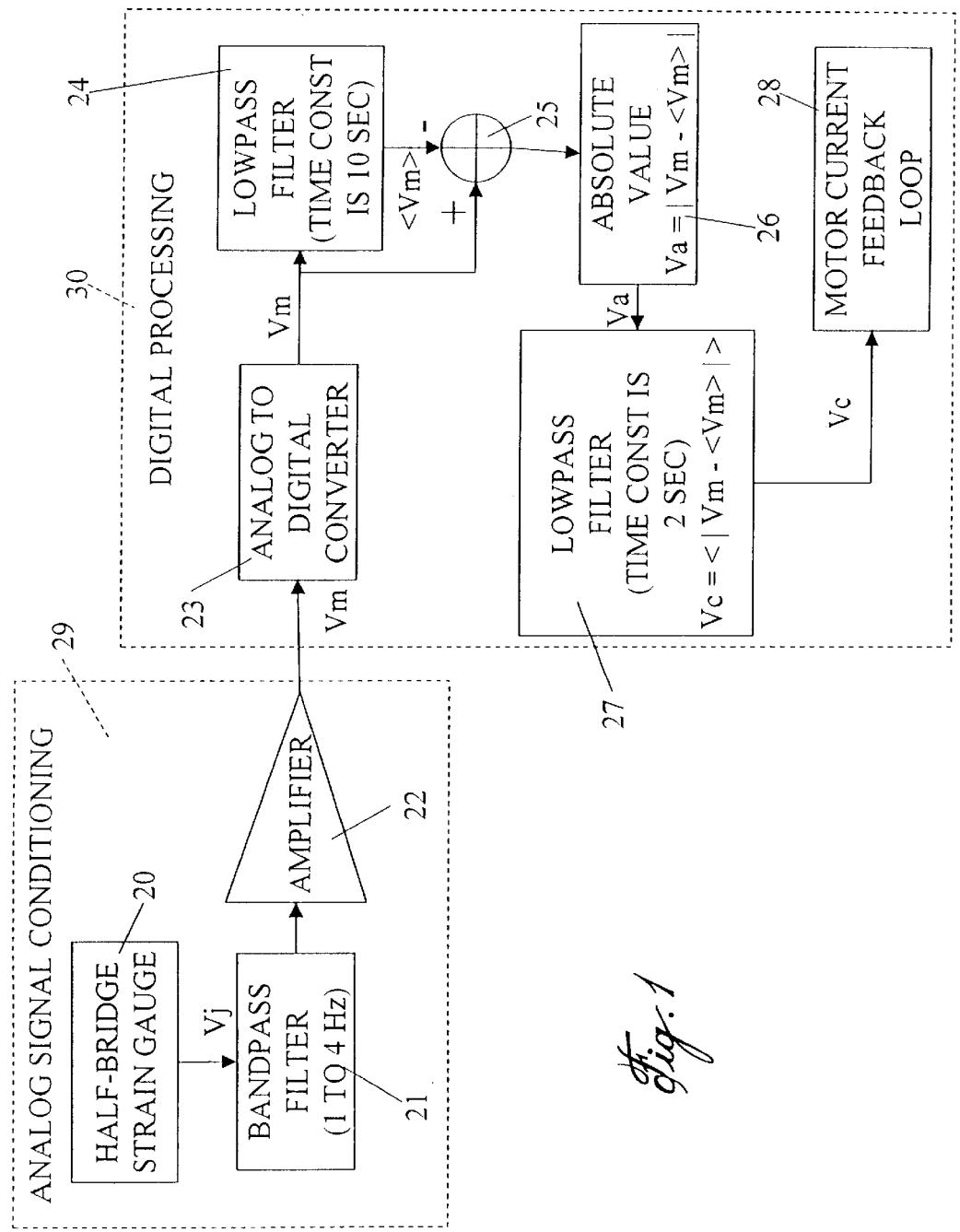
FIG. 1 is a block diagram of the proportional assistance electronic system of the present invention.

Reference is made to pending PCT application PCT/CA99/00290 which describes a DC motor connected to a rear wheel of a bicycle which can propel the rear wheel of the bicycle when the motor is activated. The proportionally assisted propulsion system of the present invention has been designed to be used with a DC motor of the type described in that PCT application.

The present invention will now be explained in more details. It is installed with a DC motor used to propel a bicycle used by a cyclist. In other embodiments, it could be installed on tricycles, carts or other man-propelled vehicles. The purpose of the present invention is to assist the person propelling the vehicle by controlling the DC motor to provide proportional and progressive energy for the propelling of the vehicle when necessary or when requested by the user. It is designed to help the cyclist in certain conditions such as when climbing abrupt hills, when facing the wind, etc. It also allows people with weaker health conditions to keep an acceptable rhythm and to enjoy sightseeing on a bicycle.

The proportional assistance mode of the system provides a motor effort proportional to the effort provided by the user. The level of assistance is determined by the user and is communicated to the control means of the motor for proper adjustment. Examples of assistance levels are shown in Table 1.

TABLE 1

Examples of Assistance Levels

| Mode | Assistance Level | Percentage of user effort added by motor | Remarks |
|---|---|---|---|
| 1 | 0.25 | 25% | Cancels the weight of the bicycle |
| 2 | 0.50 | 50% | For climbing small hills or when facing the wind |
| 3 | 1.00 | 100% | For climbing big hills and fighting strong winds |
| 4 | 2.00 | 200% | |
| 0 | Variable | Variable | To obtain a varying assistance using a throttle sub-system |

Preferably, the motor assists the cyclist only when the bicycle has reached a speed superior to 2 km/hr. This ensures that the motor does not propel the vehicle while the user was stopped or that the bicycle does not react too abruptly to effort required by the user. The assistance level varies with the gear ratio used by the cyclist.

Because of safety reasons, it might be preferable to restrict the total effort provided by the motor. According to the safety regulations for each country, maximum speeds are allowable. For example, for Canada, the motor power available is progressively reduced after the bicycle speed has reached 25 km/hr to become nil at 32 km/hr. If the cyclist wishes to go faster, the motor will not be assisting him.

In the varying assistance mode, a power adjuster is provided to the cyclist who can use it as a means to vary the effort provided by the motor, in a manner similar to gas-powered motorcycles.

The following table describes approximate distances traveled with a fully charged battery.

TABLE 2

Examples of approximate distances traveled on a full battery.

| Mode | Effort by user | Effort by motor | Approximate Distance traveled |
|---|---|---|---|
| 0 | None, user does not pedal | Varying | 20 km |
| 0 | Light pedaling | Varying | 30 km |
| 0 | Full pedaling | None | Unlimited |
| 1 | Full pedaling | 25% of the effort of user | 45 km |
| 2 | Full pedaling | 50% of the effort of user | 40 km |
| 3 | Full pedaling | Same effort as user | 35 km |
| 4 | Full pedaling | Twice the effort of user | 30 km |

The effort or energy provided by the cyclist is measured by the strain gauge 20 located on the shaft 40 of a rear wheel of the bicycle, which is subjected to a low, but measurable horizontal flexion created by the chain which is put under tension by the pedal assembly which is operated by the user.

It will be understood that the gauge could be located on a shaft of a front wheel of the bicycle or on any other portion of the bicycle which is subjected to a deformation caused by the effort of the cyclist. For example, the shaft of the pedal assembly could be used to mount the gauge. Similarly, a portion of the frame of the bicycle could also be used.

Figure 3:
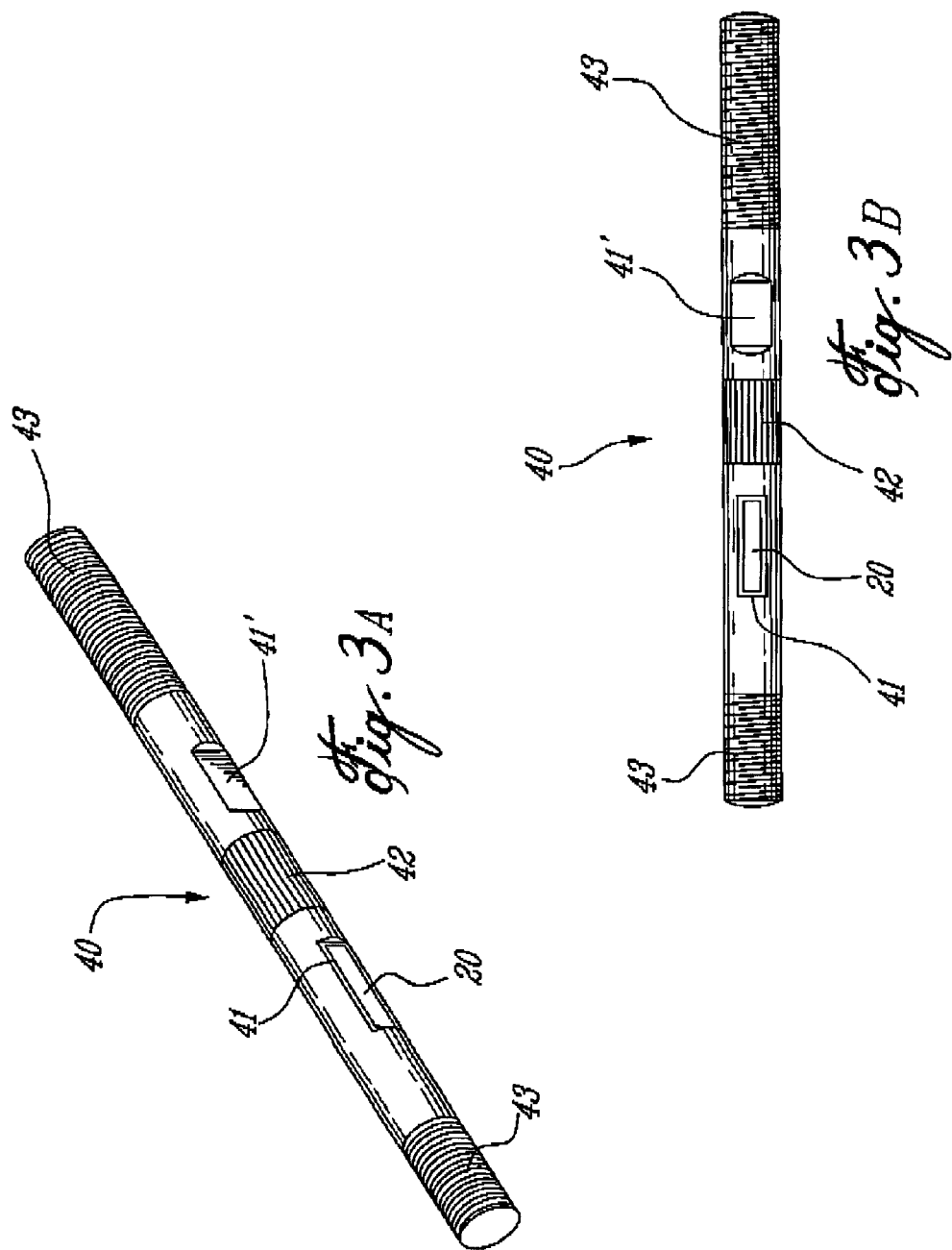
FIG. 3A is a perspective view of the shaft of a wheel of the bicycle on which is secured the motor stator core which is stationary and wherein the shaft is provided with a flat face for mounting a strain gauge and FIG. 3B shows the shaft in its secured position between the forks of a bicycle with the strain gauge positioned in a vertical plane.
Figure 4:
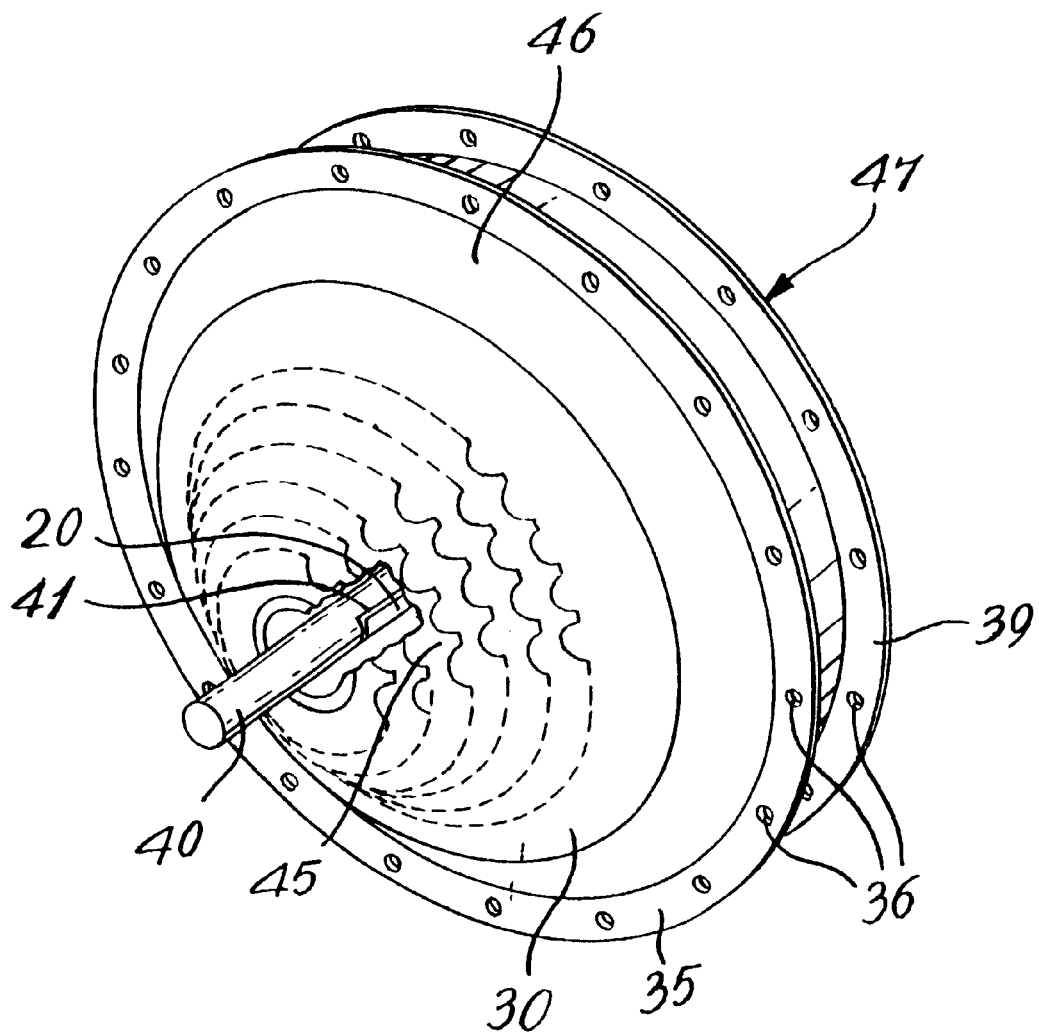
FIG. 4 is a perspective view of the assembled DC motor about the shaft of FIG. 3 with the motor housing partly fragmented to show the position of the strain gauge.

In order to prevent signal noise coming from vertical movements of the cyclist on the bicycle (vertical strains on the shaft), the strain gauge 20 is placed on a vertical surface 41 located on the fixed shaft 40, as shown in FIGS. 3 and 4.

The typical range of duration of the rotation of the pedal assembly is 0.5 to 2 seconds. Counting two pushes on the pedal assembly per rotation of the pedal assembly, a quasi-periodical gauge signal is obtained, having a quasi-sinusoidal shape, the frequency of which being between 1 and 4 Hz. To minimize hardware and installation costs, a half-bridge strain gauge is preferably used.

The circuit and processing response time should be such that the motor can progressively assist the cyclist when he begins to pedal. Similarly, the propulsion provided by the system should decrease quite rapidly when the cyclist stops pedaling. The propulsion drive should be immediately stopped when the brake is activated. This low response time is preferable to prevent sudden accelerations of the bicycle or slow decelerations which could result in injuries for the user or accidents. It will be understood that the motor could be mounted on the front wheel or the rear wheel of the vehicle.

Reference is now made to FIG. 1 in which a block diagram of the system of the present invention is shown. The half-bridge strain gauge 20 is powered by a 5V power source regulated from an electric battery. The power source is preferably an electric battery mounted on the bicycle which can be charged and discharged using prior art systems. The battery can preferably be a 24 volts, 7–8 Ah or 36 volts battery. The gauge signal Vj is about 2 mVAC superposed to a 2.5V DC level.

The variation of the gauge signal Vj is very small, and should be considerably amplified for further processing. The preferred amplification ratio is above a thousand to one. However, in order to prevent amplifying any DC component which could saturate the amplifier as well as to prevent having to make a zero adjustment on the measurement bridge, especially since such a zero adjustment could be useless in the case of a temperature deviation or of other environmental conditions, an AC coupling is used between the gauge 20 and the amplifier 22 using a bandpass filter 21 of the first order having a passing band of 1 to 4 Hz.

The amplifier 22 gain is adjusted so that all of the measurement range of the analog to digital converter 23 can be used. The output signal Vm obtained at the output of the amplifier 22 is about 3 Vpp centered at the 2.5V DC level with an equivalent mass of 70 Kg on the pedal assembly. This average value Vm is calculated for an average gear ratio. As will be readily understood, the peak-to-peak voltage will be different for another gear ratio and this is acceptable since the exact level of assistance is not critical for this application. A precision of ±20% is sufficient in most cases.

The amplifier signal Vm is digitized every 4 msec in order to obtain an accurate numerical average.

In order to compensate for any deviation of the amplifier, a digital filter 24 with a time constant of 10 seconds is used to obtain the DC level (about 2.5 V) of the signal at the output of the amplifier 22.

In order to obtain a sufficiently rapid response time for the system taking into account the effort provided by the cyclist, the average value of the rectified gauge signal is calculated using a low pass filter 27 with a 2 second time constant, in real time, using Vout=<|Vm−<Vm>|>. This technique has shown to be more simple and rapid than other numerical techniques.

The amplified signal is integrated to obtain the mean DC level and is used to compensate for temperature drift over time. Furthermore, this integrated signal is subtracted from the digitized amplified signal to obtain a resulting signal well centered around zero.

Figure 2:
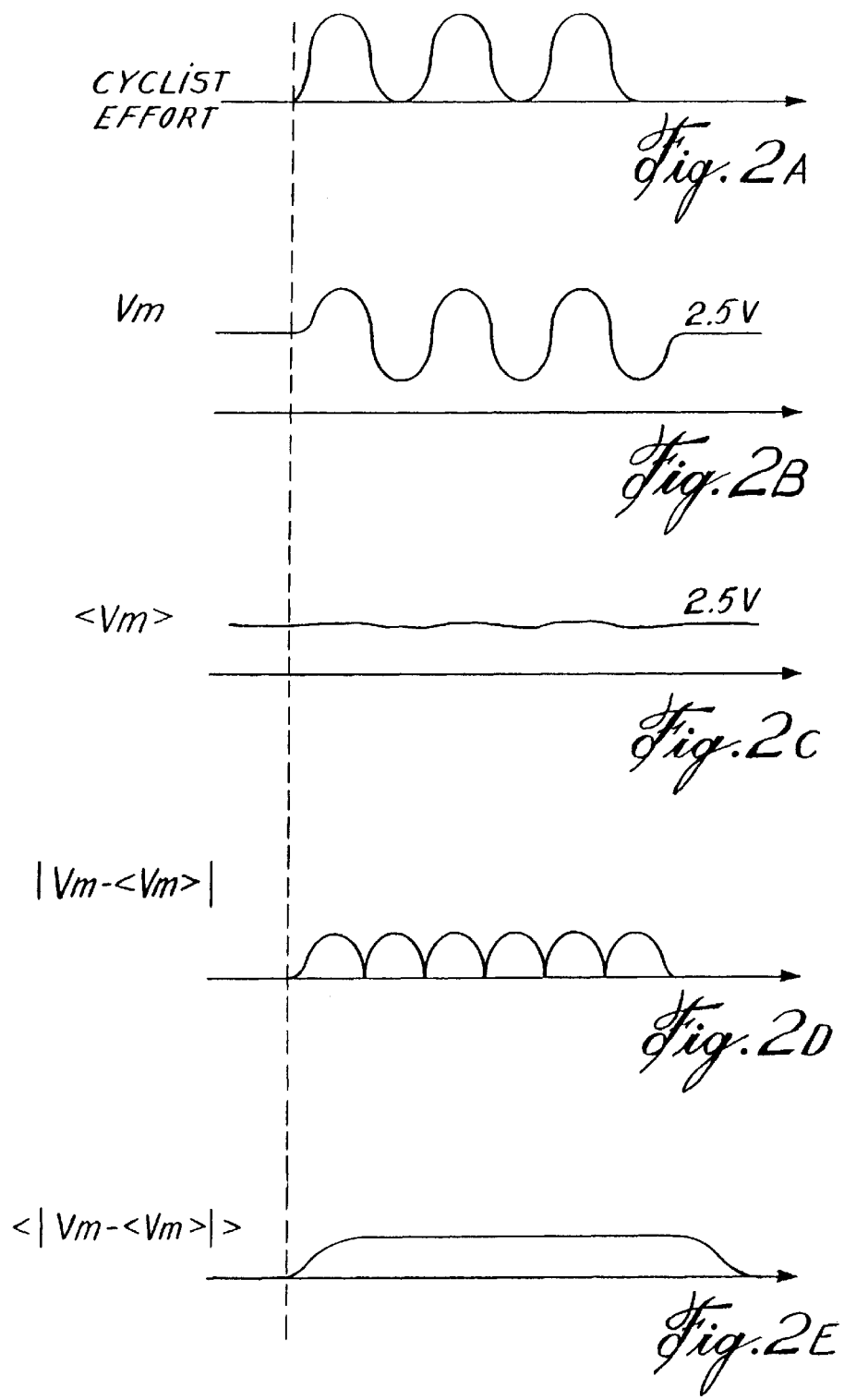
FIG. 2A, FIG. 2B, FIG. 2C, FIG. 2D and FIG. 2E is a set of comparative curves.

FIGS. 2A to 2E show the results of these processing steps. In FIG. 2A, the voltage representing the cyclist effort is shown. In FIG. 2B, the voltage measured by the gauge Vm is shown, with a 2.5 V DC level. In FIG. 2C, the filtered signal <Vm> is shown, oscillating around 2.5 V. In FIG. 2D, the absolute value signal Va is shown and is calculated as |Vm−<Vm>|. In FIG. 2E, the signal Vc fed to the motor current feedback loop is shown and is calculated as <|Vm−<Vm>|>. The motor current feedback loop then uses this voltage as an input to calculate and produce the proportional effort required from the motor. Pending PCT application PCT/CA99/00290 which describes a DC motor connected to a rear wheel of a bicycle which can propel the rear wheel of the bicycle when the motor is activated by the cyclist describes how the input voltage is used to create an adequate and proportional force on the wheel. Preferably, the DC motor is a maintenance-free DC motor.

For a given effort on the pedal assembly, the horizontal micro-flexion of the rear shaft 40 will vary according to the gear ratio selected. Therefore, it is possible to require a high precision on the amount of assistance being provided by the proportional assistance system in any situation, simply by calculating the proportional effort required for each gear ratio and effort/flexion.

If the amount of assistance being requested is high, a low effort on the pedal assembly will produce a great motor torque and it is therefore important for proper functioning of the apparatus that the wheel alignment and balancing be reasonably well done. For example, an extreme behavior of the wheel could induce non-negligible flexions on the shaft 41 which the gauge circuit would interpret as an effort provided by the cyclist. This phenomenon is most likely to appear at high speeds (greater than 20 km/hr) when the frequency of these flexions would fall in the passing band of the analog filter.

The following table lists typical power and speed characteristics for a plurality of apparatus made according to the invention.

TABLE 3

Typical characteristics

| Continuous Power | Peak Power | Maximum Speed | Weight of the kit including the motor but not the battery |
|---|---|---|---|
| 180 W | 450 W | 20 mph/32 Km/h | 7 lb/3.2 Kg |
| 240 W | 650 W | 20 mph/32 Km/h | 8 lb/3.7 Kg |
| 300 W | 810 W | 10 mph/16 Km/h | 8.8 lb/4 Kg |

For the apparatus having the 180 W continuous power, the nominal torque is 7 Nm and the maximum torque is 25 Nm.

FIGS. 3A and 3B show the shaft 40 provided with a flat mounting surface 41 on which the strain gauge 20 is to be mounted. Threading 43 at opposed ends of the shaft 40 are used to mount the shaft between the fork arms of a frame of a bicycle wheel, as well known in the art. The core of the motor stator, not shown, is mounted press-fit on the shaft 40 over the knurled portion 42. The other recessed flat portion 41' is to provide passage for wiring. FIG. 3B shows the portion of the shaft 40 when secured to a bicycle wheel with the strain gauge 20 disposed vertically on the flat mounting surface 41. Any flexion of the shaft 40 due to a pedal effort by a user will cause a micro deformation in the surface 41 which will be detected by the strain gauge 20 mounted thereon.

FIG. 4 shows the assembled motor about the shaft with the gear assembly 45 secured to the side wall 30 of the motor housing 46 rotating about the stator core secured fixed to the shaft 40. Wires properly disposed are used to connect the motor 47 and the circuitry to the battery and to the user control command and interface. The strain gauge 20 is mounted on the vertical surface 41 of the shaft 40 and protected by the rotor housing 30.

The holes 36 located in the housing sidewall portions 35 and 39 are for receiving the spokes 37 of the bicycle wheel 38 as shown in FIG. 6.

Figure 5:
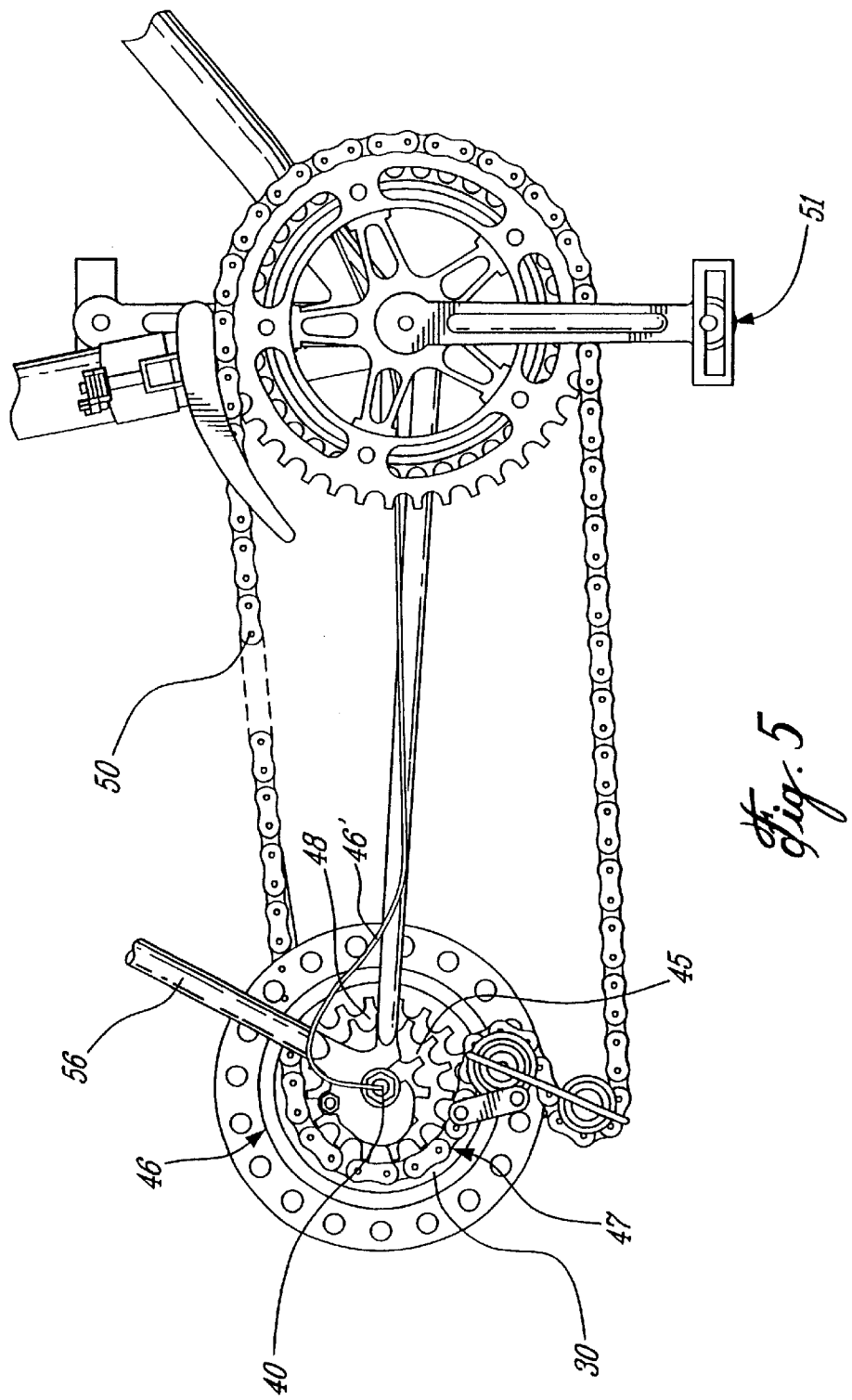
FIG. 5 shows the DC motor assembled on the axle or shaft of FIG. 3 secured to a vehicle frame supporter the rear wheel of a bicycle.

FIG. 5 shows a detail of the assembled axle together with the gear assembly 45 mounted on the side wall 30 of the rotor housing 46 rotatable about the fixed shaft 40 i.e., the rear shaft 40 of a bicycle. The fork arm of the frame of the bicycle is referred to with numeral 56. The pedal assembly 51 is also shown with the bicycle chain 50.

FIG. 6 shows a complete bicycle equipped with the DC motor system of the present invention. The motor 47 is assembled about the shaft 40 together with the gear assembly. A battery 60 is shown mounted on a portion of the frame 56 of the bicycle and the user command interface 61 is shown mounted near the handles of the bicycle. As will be readily understood, the battery 60 and the user interface 61 could be mounted anywhere on the bicycle although the shown mounting locations are preferable. The bicycle chain 50 is shown as are the gears 44.

It will be understood that numerous modifications thereto will appear to those skilled in the art. Accordingly, the above description and accompanying drawings should be taken as illustrative of the invention and not in a limiting sense. It will further be understood that it is intended to cover any variations, uses, or adaptations of the invention following, in general, the principles of the invention and including such departures from the present disclosure as come within known or customary practice within the art to which the invention pertains and as may be applied to the essential features herein before set forth, and as follows in the scope of the appended claims.

What is claimed is:

1. A system for proportionally assisting by a DC motor propulsion of a wheeled vehicle propelled by a user who provides a user effort, comprising:

detection and measurement means for detecting and measuring a flexion of a fixed shaft of a wheel of said vehicle on which said DC motor is secured and subjected to said user effort, said detection and measuring means being mounted on a flat vertical surface formed in said fixed shaft;

assistance level request means for requesting a level of assistance to be provided;

digitizing means for digitizing a signal obtained from said detection and measurement means;

effort calculation means to calculate, in real time, the user effort provided by said user using said digitized signal;

assistance level calculation means for calculating an appropriate assistance effort to be provided by a DC motor mounted on said wheel using a value of said user effort and a value of said level of assistance requested;

control means for controlling an assistance effort to be provided by said DC motor mounted on said shaft of said wheel and using a value of said appropriate assistance effort;

wherein said user effort and said level of assistance requested are used to proportionally assist propulsion of said vehicle by said DC motor.

2. A system as claimed in claim 1, wherein said detection and measurement means is a strain gauge.

3. A system as claimed in claim 1, wherein said wheel is said rear wheel of said wheeled vehicle.

4. A system as claimed in claim 1, wherein said DC motor is powered by an electric battery.

5. A system as claimed in claim 1, further comprising amplification means for amplifying said measured signal obtained from said detection and measurement means.

6. A system as claimed in claim 1, further comprising filter means for a compensation circuit for compensating for any deviation of said measured signal by filtering out deviation in said signal.

7. A system as claimed in claim 1, wherein a stator core of said motor is mounted on said fixed shaft, said motor having a rotor housing secured to said wheel for rotation about said stator core.

8. A system as claimed in claim 1, wherein said flexion of said fixed shaft is horizontal with respect to ground on which said vehicle is used.

9. A system as claimed in claim 7, further comprising a filter at an input of said amplification means.

10. A system as claimed in claim 1, wherein said DC motor is a maintenance-free DC brushless motor.

11. A system as claimed in claim 1, wherein there is further provided amplification means for amplifying a measurement signal coming from said strain gauge;

a filter at an input of said amplification means;

an analog to digital converter at an output of said amplification means;

a digital processing circuit to digitize a signal at said output of said amplification means to compensate for any deviation of the said signal to calculate, in real time, the effort provided by the cyclist on gears secured to said motor and transferred to said fixed shaft and to control the assistance effort of the DC motor secured to the rear wheel of the bicycle to give a progressive assistance to the cyclist.

12. A method for proportionally assisting a propulsion of a wheeled vehicle propelled by a user who provides an user effort, comprising:

detecting and measuring a flexion of a fixed shaft of said vehicle subjected to said user effort by a detection and measuring means mounted on a flat vertical surface formed in said fixed shaft;

requesting a level of assistance to be provided;

digitizing a signal obtained from said detection and measuring means;

calculating, in real time, the user effort provided by said user using said digitized signal;

calculating an appropriate assistance effort to be provided by a DC motor mounted on said wheel using a value of said user effort and a value of said level of assistance requested;

controlling an assistance effort to be provided by said DC motor using a value of said appropriate assistance effort;

wherein said user effort and said level of assistance requested are used to proportionally assist propulsion of said vehicle by said DC motor.

13. A method as claimed in claim 12, further comprising amplifying said measured signal obtained from said detection and measuring means which is a strain gauge providing signals representative of micro deformations in said flat surface.

14. A method as claimed in claim 12, further comprising compensating for any deviation of said measured signal by filtering out deviation in said signal.

15. A method as claimed in claim 13, further comprising filtering said measured signal prior to said amplifying.

16. A method as claimed in claim 13, further comprising amplifying said measured signal;

filtering said measured signal prior to amplifying;

converting said measured signal from analog to digital after said amplifying;

digitizing the amplified signal to compensate for any deviation of the said signal to calculate, in real time, the effort provided by the cyclist and transmitted to said fixed shaft whereby to control the assistance effort of the DC motor on the rear wheel of the bicycle to give a progressive assistance to the cyclist.

* * * * *